(12) United States Patent
Joh et al.

(10) Patent No.: US 9,885,439 B2
(45) Date of Patent: Feb. 6, 2018

(54) PIPE JOINT

(75) Inventors: Shigeyuki Joh, Tsukubamirai (JP);
Yusuke Saito, Tsukubamirai (JP)

(73) Assignee: SMC KABUSHIKI KAISHA, Tokyo (JP)

( * ) Notice: Subject to any disclaimer, the term of this patent is extended or adjusted under 35 U.S.C. 154(b) by 865 days.

(21) Appl. No.: 13/143,125

(22) PCT Filed: Jan. 8, 2010

(86) PCT No.: PCT/JP2010/050137
§ 371 (c)(1),
(2), (4) Date: Jul. 1, 2011

(87) PCT Pub. No.: WO2010/082534
PCT Pub. Date: Jul. 22, 2010

(65) Prior Publication Data
US 2011/0278841 A1    Nov. 17, 2011

(30) Foreign Application Priority Data

Jan. 14, 2009  (JP) ................................ 2009-005788
Jun. 18, 2009  (JP) ................................ 2009-145203

(51) Int. Cl.
*F16L 27/00* (2006.01)
*F16L 41/10* (2006.01)
*F16L 41/00* (2006.01)

(52) U.S. Cl.
CPC ............ *F16L 41/10* (2013.01); *F16L 41/007* (2013.01); *F16L 2201/10* (2013.01)

(58) Field of Classification Search
USPC ......... 285/347, 351, 219, 220, 136.1, 143.1, 285/139.2, 204
See application file for complete search history.

(56) References Cited

U.S. PATENT DOCUMENTS

| 3,151,893 | A | * | 10/1964 | Lyon | ........................ 285/143.1 |
| 4,448,447 | A | * | 5/1984 | Funk et al. | ...................... 285/4 |
| 4,687,235 | A | | 8/1987 | Stoll | |
| 5,165,731 | A | * | 11/1992 | Kimuta | ........................ 285/220 |

(Continued)

FOREIGN PATENT DOCUMENTS

| CN | 2323228 Y | 6/1999 |
| EP | 1 279 880 A1 | 1/2003 |

(Continued)

OTHER PUBLICATIONS

Office Action dated Apr. 23, 2012 in Russian Patent Application No. 2011127773 (with English translation).

(Continued)

*Primary Examiner* — Aaron Dunwoody
(74) *Attorney, Agent, or Firm* — Oblon, McClelland, Maier & Neustadt, L.L.P.

(57) ABSTRACT

In a pipe joint, a tapered male screw thread is provided at one end and a joint connection section which is connected to a joint section is provided at the other end. The tapered male screw thread has a length adapted so that, when the tapered male screw thread has been fastened to a tapered female screw thread formed in an end cap, the entire length is engaged with the tapered female screw thread, and the sealing effect is obtained by a seal member.

5 Claims, 6 Drawing Sheets

(56) References Cited

U.S. PATENT DOCUMENTS

| | | | |
|---|---|---|---|
| 5,433,489 A * | 7/1995 | Kimura et al. | 285/220 |
| 5,662,358 A | 9/1997 | Lees et al. | |
| 7,354,075 B2 * | 4/2008 | Hagen | 285/143.1 |
| 7,588,253 B2 * | 9/2009 | Bottura | 277/609 |

FOREIGN PATENT DOCUMENTS

| | | |
|---|---|---|
| FR | 1 085 339 A | 1/1955 |
| JP | 4 85 | 1/1992 |
| JP | 6 28466 | 4/1994 |
| RU | 2 101 603 C1 | 1/1998 |
| WO | WO 03/091617 A1 | 11/2003 |
| WO | WO 2008/047002 A2 | 4/2008 |

OTHER PUBLICATIONS

International Search Report dated Feb. 2, 2010 in PCT/JP10/050137 filed Jan. 8, 2010.

Combined Office Action and Search Report dated Nov. 5, 2012 in Chinese Application No. 201080004570.8 (With English Translation).

Extended European Search Report dated Jul. 10, 2013 issued in European Patent Application No. 10731203.5.

\* cited by examiner

PIPE JOINT

TECHNICAL FIELD

The present invention relates to a pipe joint equipped with tapered screw threads, and more specifically, relates to a pipe joint equipped with tapered screw threads, a male screw thread portion of which is shorter than a tapered screw thread as regulated by Japanese Industrial Standards, while possessing sufficient pressure resistance, the tapered screw threads being suitable for making the pipe joint smaller.

BACKGROUND ART

Heretofore, for example, a pipe joint has been widely adopted, which is fastened for enabling introduction and discharge of a fluid with respect to a fluid pressure device or the like, with a tube being connected to the pipe joint. In this case, a tapered female screw thread is formed in the fluid pressure device, whereas a tapered male screw thread adapted to the tapered female screw thread is engraved onto the pipe joint, and the tapered male screw thread is screw-inserted into the tapered female screw thread. As disclosed in Japanese Laid-Open Patent Publication No. 04-000085, the present applicants have already proposed a pipe joint, which includes and makes use of tapered screw threads in this manner.

Incidentally, generally, for assuring airtightness and liquid-tightness more securely, a sealing tape is wrapped around the male screw thread, or alternatively, a sealing material is coated thereon when the male screw thread is screw-engaged with the female screw thread.

A structure having this type of tapered screw threads is shown in FIG. 6. In FIG. 6, for example, reference numeral 2 indicates an end cap of a pneumatic cylinder. A tapered female screw thread 4 is engraved in the end cap 2. The tapered female screw thread 4 is a female screw thread with which a tapered male screw thread of a pipe joint according to Japanese Industrial Standards is screw-engaged.

Reference numeral 6 indicates a pipe joint, which is screw-engaged with the tapered female screw thread 4. The pipe joint 6 is made from a metallic material, and more specifically, includes a cylindrically shaped main body 8, a hexagonal fastening member 10, for example, for facilitating rotation of the pipe joint 6 using a wrench or the like when the main body 8 is screw-inserted into the tapered female screw thread 4, an o-ring 14 installed in an annular groove 12 provided on one end of the main body 8, a sharp projection 16 circumferentially disposed around the vicinity of the o-ring 14, and a tapered male screw thread 18 provided at the other end of the main body 8 and which is screw-inserted into the tapered female screw thread 4. Further, a penetrating passage 20 for introduction and discharge of a fluid is provided in the main body 8 extending along the axial direction of the main body 8.

To the pipe joint 6, which is constructed in the foregoing manner, a one-touch coupling 22 is connected. The one-touch coupling 22 includes a bent main body portion 24 made of a synthetic resin material, and a coupling portion 26, which is installed in one end of the main body portion 24. The coupling portion 26 is a conventional article made up from a chuck, a collet, a release bush, a seal ring, etc., and thus, detailed description of the coupling portion 26 is omitted.

For installing the pipe joint 6 into the tapered female screw thread 4 of the end cap 2, a sealing tape is wound around or alternatively a sealing material is coated beforehand onto the periphery of the tapered male screw thread 18. Additionally, a wrench is latched onto the fastening member 10 and the pipe joint 6 is rotated clockwise thereby. As a result, the pipe joint 6 is gradually screw-inserted into the tapered female screw thread 4, and as shown in FIG. 6, after the pipe joint 6 has been screw-inserted a predetermined distance, rotation of the fastening member 10 is stopped.

More specifically, with this type of tapered screw threads, a lower surface of the fastening member 10 does not come into abutment against a surface of the end cap 2, but rather, a state is observed in which the tapered male screw thread 18 remains exposed to the exterior. Such a condition complies with regulations according to Japanese Industrial Standards.

Next, the one-touch coupling 22 is mounted and latched in the pipe joint 6. More specifically, another end of the one-touch coupling 22 is inserted on the side of the o-ring 14 of the pipe joint 6. As a result, an engagement part made up from the sharp projection 16 bites into an inner wall part of the main body portion 24, which is made from a synthetic resin material, whereby the one-touch coupling 22 is connected integrally with the pipe joint 6 so that introduction and discharge of a fluid can be carried out.

To enable integrated attachment of the pipe joint 6 and the end cap 2, concerning the screw-engagement of the tapered male screw thread and the tapered female screw thread, according to Japanese Industrial Standards, for example, the tapered female screw thread 4 and the tapered male screw thread 18 must be of sufficient length. Consequently, even if the tapered male screw thread 18 is screw-inserted into the tapered female screw thread 4, the bottom end surface of the fastening member 10 cannot come into contact with the upper surface of the end cap 2, and a portion of the tapered male screw thread 18 remains exposed to the exterior.

Additionally, in actuality, it is difficult and troublesome to carry out a confirmation operation to ensure that the tapered male screw thread 18 has been fastened and fitted sufficiently with respect to the tapered female screw thread 4, so as to assure an airtight or liquid-tight state.

Furthermore, when an airtight or liquid-tight state is assured by wrapping a sealing tape around or coating a sealing material onto the tapered male screw thread 18, the number of assembly steps is increased, and costs for the sealing tape or sealing material lead to a rise in costs overall, which are reflected in the product price.

Still further, because the length of the tapered female screw thread 4 and the length of the tapered male screw thread 18 are determined in accordance with Japanese Industrial Standards, it is difficult to make the pipe joint smaller in scale. In addition, when a sealing tape or sealing material is used, upon threading (screw rotation) thereof, fragments or debris of the sealing tape or the sealing material become intermixed inside the fluid flow passage, and as a result, such powders are introduced from the end cap 2 into the cylinder chamber, leading to a concern that operations of the cylinder itself will be obstructed.

Still further, when the sealing tape or the sealing material has been used once and the pipe joint 6 is taken out from the end cap 2, the sealing tape or the sealing material cannot easily be reused. Thus, when the pipe joint 6 is reinstalled with respect to the end cap 2, a need arises for a sealing tape or a sealing material to be newly prepared, which is troublesome.

SUMMARY OF INVENTION

A general object of the present invention is to provide a pipe joint, which can be made smaller in scale, and which does not require use of a sealing tape or a sealing material.

The present invention is characterized by a pipe joint having a tapered male screw thread that is screw-inserted into a tapered female screw thread formed in an object body. The pipe joint comprises a cylindrically shaped main body, a fastening member for screw-rotating the tapered male screw thread which is formed on an end of the main body, a joint connector provided at another end of the main body and which is equipped with an inner circumferential surface, a first seal member being gripped between the inner circumferential surface and a one-touch coupling, and a seat disposed at a lower side of the fastening member and on which a second seal member is seated for carrying out sealing jointly with the object body. The tapered male screw thread has a length such that, after the fastening member has been fastened, an entire length of the tapered male screw thread is screw-inserted into the tapered female screw thread of the object body.

DESCRIPTION OF EMBODIMENTS

Figure 6:
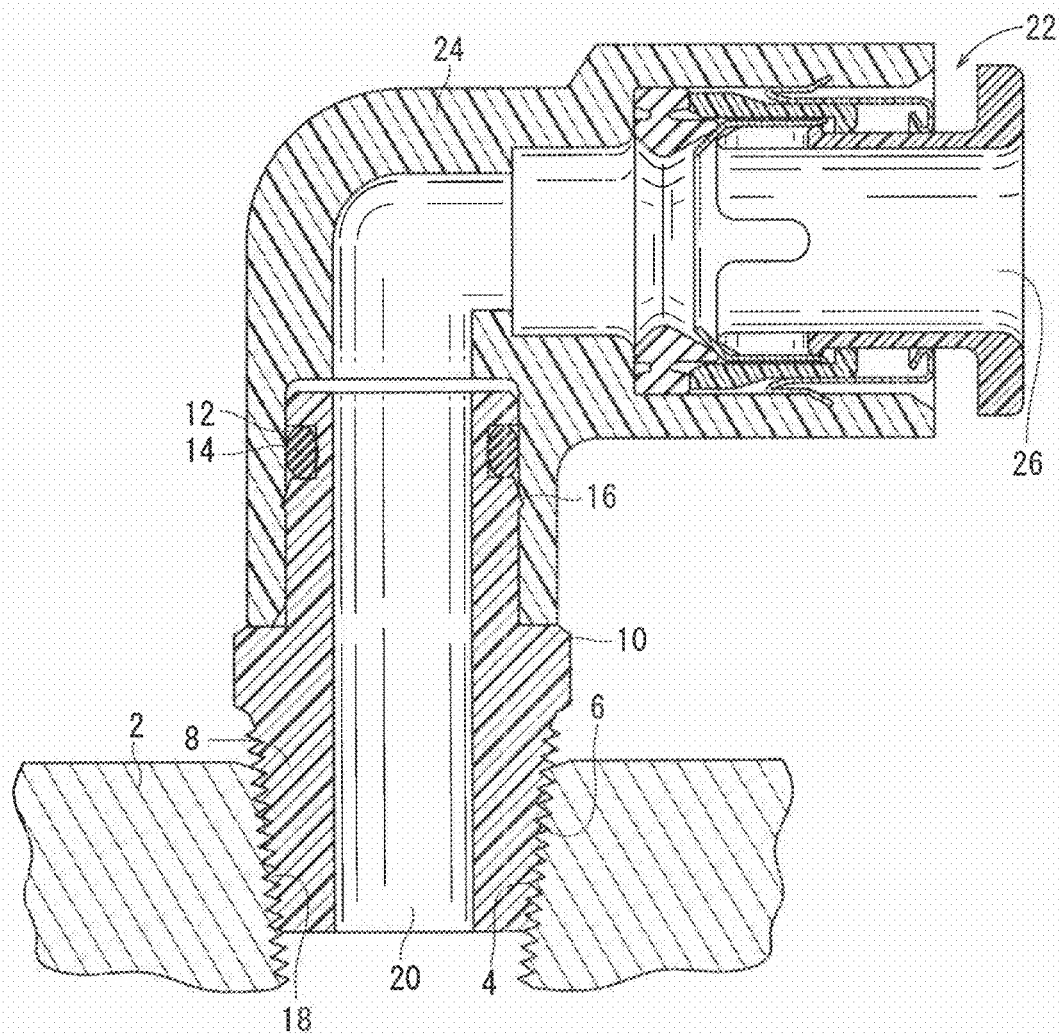
FIG. 6 is an overall vertical cross sectional view of a pipe joint according to a conventional technique.

The pipe joint 30 is screw-inserted into an object body, for example, the end cap 32 of a cylinder. The end cap 32 includes a tapered female screw thread 34, which extends perpendicularly to the axial direction thereof, whereas the pipe joint 30 includes, on one end thereof, an annular shaped main body 38 on which a tapered male screw thread 36 is engraved for screw-insertion into the tapered female screw thread 34. At the other end of the main body 38, a joint connector 39 is provided, to which there is directly connected a joint member 46 in which the one-touch coupling 22, also shown by reference numeral 22 in FIG. 6, is installed.

The main body 38 includes a passage 40 that penetrates therethrough in the axial direction, and further includes, on an opposite side from the tapered male screw thread 36, a slanted inner circumferential surface 44 for seating thereon of an o-ring like first seal member 42. Furthermore, an annular projection 48 is formed at the interior thereof, for engagement with the joint member 46, as shown by the conventional technique of FIG. 6. On an outer circumferential surface of the pipe joint 30 corresponding to the annular projection 48, a fastening member 50 is formed for facilitating screw-rotation of the pipe joint 30 using a wrench or the like.

The lower end outer circumference of the fastening member 50 has a curved surface shape therearound, and between such a curved surface and a starting end of the tapered male screw thread 36, a seat 54, which is bent in cross section, is provided for seating thereon of a second seal member 52. The second seal member 52 is gripped between the seat 54 and a tapered surface 56, which is formed at a starting end side of the tapered female screw thread 34 of the end cap 32.

The pipe joint 30 according to the first embodiment of the present invention is basically constructed as described above. Next, operations and effects of the pipe joint 30 shall be explained.

The bent shaped joint member 46 is fitted into engagement with the pipe joint 30 via the first seal member 42. At this time, the annular projection 48 of the pipe joint 30 fulfills a role to prevent the joint member 46 from being pulled out.

Next, the pipe joint 30, having been made integral with the joint member 46 in the foregoing manner, is screw-inserted into the tapered female screw thread 34 provided in the end cap 32. More specifically, the tapered male screw thread 36 is screw inserted into the tapered female screw thread 34, and is rotated in a clockwise direction. As a result, the second seal member 52, which is mounted in an intervening fashion on the seat 54, gradually is pressed by the tapered surface 56, and ultimately, the action of screw-rotating the pipe joint 30 is stopped. During this time, the entire length of the main threaded portion of the tapered male screw thread 36 is screw-inserted into the tapered female screw thread 34, such that when fastening is completed, the lower end of the fastening member 50 presses the second seal member 52, and the peripheral end portion thereof is pressed into contact against the tapered surface 56 of the end cap 32.

Owing thereto, the fact that the pipe joint 30 has been sufficiently screw-inserted into the tapered female screw thread 34 of the end cap 32 can be confirmed visually. Consequently, if pressurized air or the like, for example, is supplied from the side of the joint member 46, the pressurized air can penetrate into the interior of the non-illustrated cylinder from the end cap 32 without external leakage.

At this time, the tapered male screw thread 36 is screw-inserted sufficiently into the tapered female screw thread 34, and further, due to the sealing effect of the second seal member 52, pressurized air does not escape to the exterior from the second seal member 52. In addition, according to the present embodiment, when the pipe joint 30 is screw-inserted into the end cap 32, because a sealing tape or a sealing material is not used, the number of assembly steps is reduced, along with reducing costs. The sealing effect can also be assured sufficiently.

Further, because sufficient strength can be assured in accordance with a pressure medium such as pressurized air, an advantage exists in that the pipe joint 30 can be made relatively small in scale.

Figure 1:
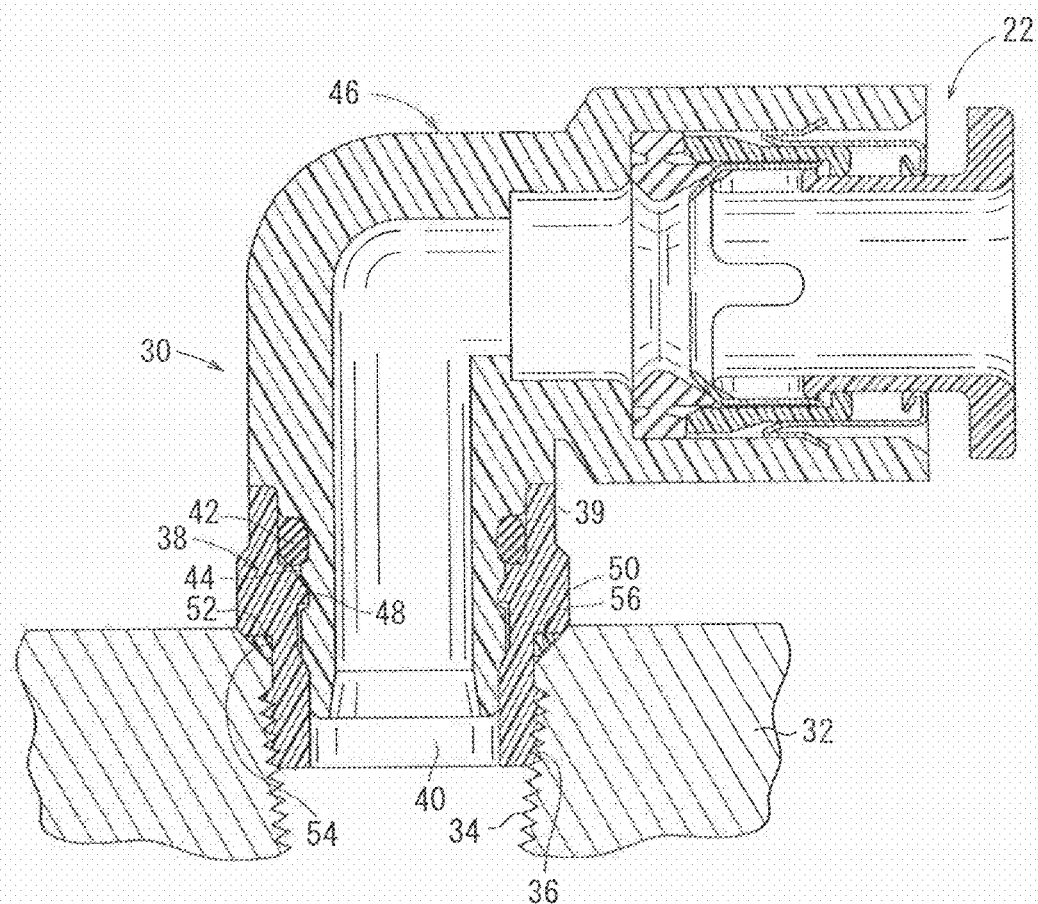
FIG. 1 is an overall vertical cross sectional view showing a pipe joint, a one-touch coupling, and an end cap according to a first embodiment of the present invention.
Figure 2:
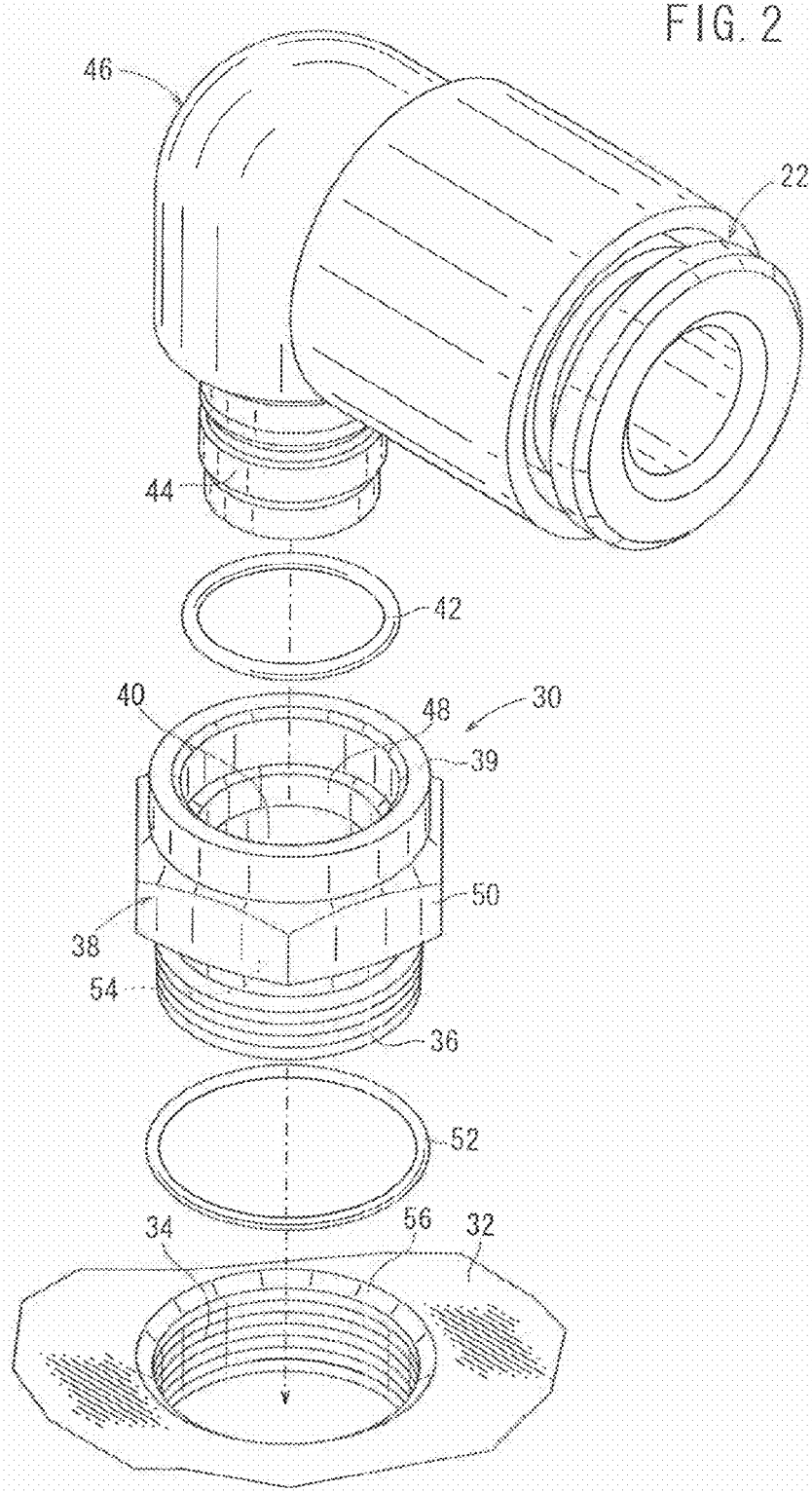
FIG. 2 is an exploded perspective view of the pipe joint shown in FIG. 1.
Figure 3:
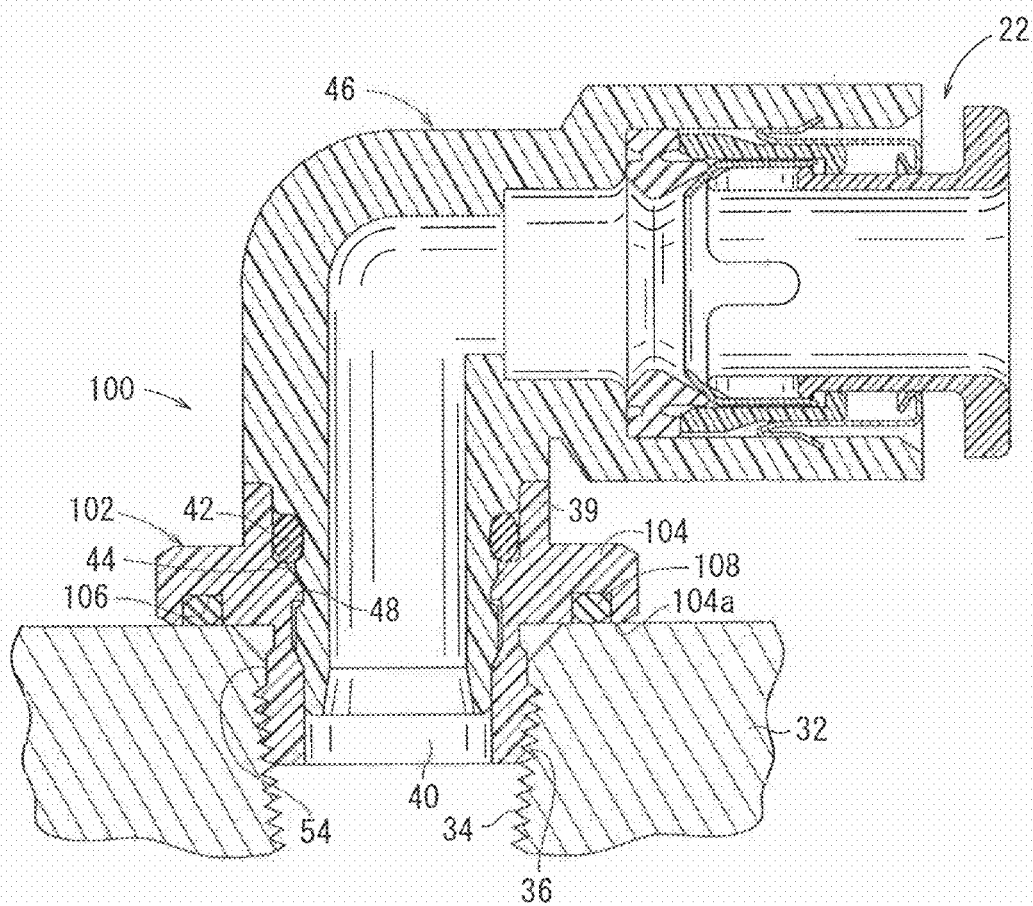
FIG. 3 is an overall vertical cross sectional view showing a pipe joint, a one-touch coupling, and an end cap according to a second embodiment of the present invention.

Next, a pipe joint 100 according to a second embodiment is shown in FIG. 3. Structural elements thereof, which are the same as those of the pipe joint 30 according to the first embodiment, are designated using the same reference characters, and detailed descriptions of such features are omitted.

The pipe joint 100 according to the second embodiment differs from the pipe joint 30 according to the first embodiment, in that a fastening member 104 of the main body 102 is formed such that the diameter thereof is expanded in a radial outward direction in comparison with the pipe joint 30, and together therewith, a second seal member 108 is installed in an annular groove 106, which is formed on a lower surface of the fastening member 104 facing toward the end cap 32.

The fastening member 104 expands in diameter perpendicularly to the axial direction of the main body 102, and the annular groove 106, which is formed on the lower surface 104*a* thereof, is formed along the fastening member 104 with a substantially rectangular shape in cross section. The second seal member 108, for example, comprises an o-ring having a circular shape in cross section, such that in a state of being mounted in the annular groove 106, the second seal member 108 projects outwardly somewhat from the lower surface 104*a* of the fastening member 104.

Additionally, when the pipe joint 100 including the main body 102 is screw-engaged with the end cap 32, the second seal member 108 is rotated while in sliding contact with the upper surface of the end cap 32. By complete abutment of the second seal member against the end cap 32, leakage of pressurized air between the end cap 32 and the main body 102 is reliably prevented.

Figure 4:
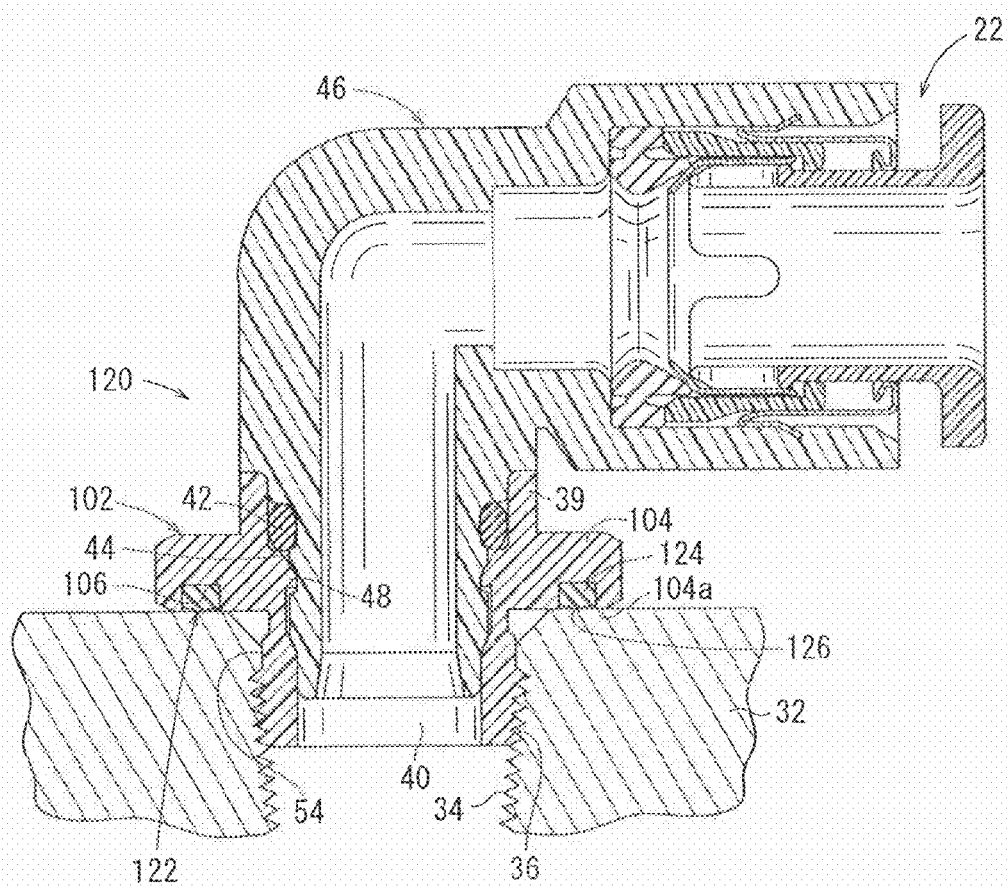
FIG. 4 is an overall vertical cross sectional view showing a pipe joint, a one-touch coupling, and an end cap according to a third embodiment of the present invention.
Figure 5:
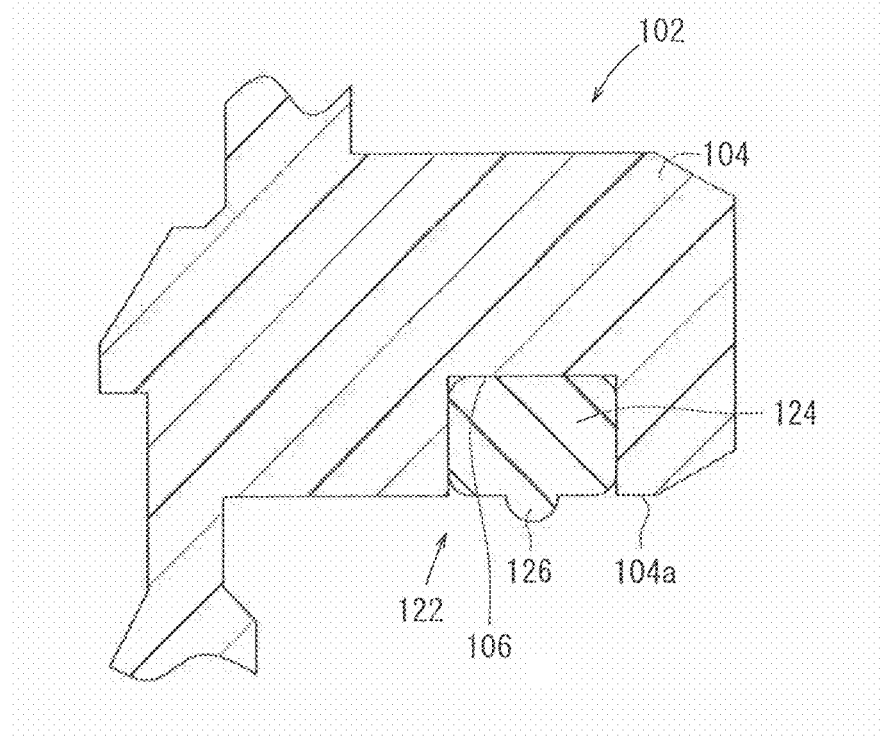
FIG. 5 is an enlarged cross sectional view of the vicinity of a fastening member showing a condition before mounting of the pipe joint of FIG. 4 in the end cap.

Next, a pipe joint 120 according to a third embodiment is shown in FIGS. 4 and 5. Structural elements thereof, which are the same as those of the pipe joint 100 according to the second embodiment, are designated using the same reference characters, and detailed descriptions of such features are omitted.

The pipe joint 120 according to the third embodiment differs from the pipe joint 100 according to the second embodiment, in that a second seal member 122, which is roughly T-shaped in cross section, is installed in the annular groove 106 that is formed in the fastening member 104 on the main body 102.

As shown in FIG. 5, the second seal member 122 is made up from a base portion 124, which is rectangular in cross section, and a projection 126, which projects downwardly with respect to the base portion 124. The base portion 124 is installed in the annular groove 106, whereas the projection 126 is formed on a lower surface of the base portion 124. The projection 126 may be disposed at a roughly central part on the lower surface of the base portion 124, or may be disposed on the base portion 124 on a radial inward side or a radial outward side from the central part.

Additionally, when the pipe joint 120 including the main body 102 is screw-engaged with the end cap 32, the main body 102 gradually is brought into proximity to the side of the end cap 32, such that at first, the main body 102 is lowered while only the projection 126 of the second seal member 122 is in sliding contact with the upper surface of the end cap 32. Owing thereto, when the pipe joint 120 is screw-engaged with respect to the end cap 32, compared to a case in which the second seal member 122 is brought into contact fully with respect to the upper surface of the end cap 32, by providing the projection 126, the contact area between the second seal member 122 and the end cap 32 can be decreased.

As a result, when the pipe joint 120 is installed, contact resistance that occurs between the second seal member 122 and the end cap 32 can be reduced, whereby the pipe joint 120 can be installed more smoothly, leakage of pressurized air between the end cap 32 and the main body 102 can reliably be prevented, and buckling or kinks in the second seal member 122 upon installation of the pipe joint 120 can be suppressed.

The invention claimed is:

1. A pipe joint comprising:
a cylindrically shaped main body;
a tapered male screw thread configured to be screw-inserted into a tapered female screw thread formed in an object body, to form an extension of the cylindrically shaped main body and to be provided toward one end of the main body, wherein the tapered male screw thread has a length such that fluid tight sealing between the pipe joint and the object body is provided when an entire length of the tapered male screw thread is screw-inserted into the tapered female screw thread of the object body and the fluid tight sealing is not provided when an entire length of the tapered male screw thread is not screw-inserted into the tapered female screw thread of the object body, and wherein the outer circumference of the tapered male screw thread is tapered to have a diameter which becomes progressively smaller in a direction toward the one end of the main body;
a fastening member for screw-rotating the tapered male screw thread;
a joint connector provided at another end of the main body and which is equipped with an inner circumferential surface, a first seal member being gripped between the inner circumferential surface and a one-touch coupling; and
a seat disposed at a side of the fastening member closer to the one end, and on which a second seal member is seated,
wherein the fastening member is positioned relative to the tapered male screw thread such that the fastening member is pressed in contact with said object body and presses the second seal member against the object body when the entire length of the tapered male screw thread is screw-inserted into the tapered female screw thread of the object body, and
the fluid tight sealing is provided when the entire length of the tapered male screw thread is screw-inserted into the tapered female screw thread of the object body with the second seal member pressed between the fastening member and the object body,
wherein the fastening member is positioned relative to the tapered male screw thread such that the fastening member is pressed in contact with said object body when the tapered male screw thread is sufficiently screw-inserted into the tapered female screw thread of the object body to provide the fluid tight sealing at the screw threads.

2. The pipe joint according to claim 1, wherein the second seal member is gripped between the seat and a tapered surface that is formed in the object body.

3. A pipe joint comprising:
a cylindrically shaped main body;
a tapered male screw thread configured to be screw-inserted into a tapered female screw thread formed in an object body, to foini an extension of the cylindrically shaped main body and to be provided toward one end of the main body, wherein the tapered male screw thread has a length such that the fluid tight sealing between the pipe joint and the object body is provided when an entire length of the tapered male screw thread is screw-inserted into the tapered female screw thread of the object body and the fluid tight sealing is not provided when an entire length of the tapered male screw thread is not screw-inserted into the tapered female screw thread of the object body, and wherein the outer circumference of the tapered male screw thread is tapered to have a diameter which becomes progressively smaller in a direction toward the one end of the main body;
a fastening member for screw-rotating the tapered male screw thread;
a joint connector provided at another end of the main body and which is equipped with an inner circumferential surface, a first seal member being gripped between the inner circumferential surface and a one-touch coupling; and a second seal member disposed on a surface of the fastening member facing toward the object body, wherein the fastening member is positioned relative to the tapered male screw thread such that the fastening member is pressed in contact with said object body and presses the second seal member against the object body when the entire length of the tapered male screw thread is screw-inserted into the tapered female screw thread of the object body, and the fluid tight sealing is provided when the entire length of the tapered male screw thread is screw-inserted into the tapered female screw thread of the object body with the second seal member pressed between the fastening member and the object body, wherein the fastening member is positioned relative to the tapered male screw thread such that the fastening member is pressed in contact with said object body when the tapered male screw thread is sufficiently screw-inserted into the tapered female screw thread of the object body to provide the fluid tight sealing at the screw threads.

4. The pipe joint according to claim 3, wherein the second seal member is formed in an annular shape, and is installed in an annular groove formed in the surface of the fastening member facing toward the object body.

5. The pipe joint according to claim 4, wherein the second seal member includes a projection that projects from the surface of the fastening member facing toward the object body.

* * * * *